US012804445B2

(12) United States Patent
Van Phan et al.

(10) Patent No.: US 12,804,445 B2
(45) Date of Patent: Nov. 17, 2026

(54) APPARATUS, METHODS AND COMPUTER PROGRAMS SUPPORTING DIFFERENT QUALITY OF EXPERIENCE LEVELS

(71) Applicant: Nokia Technologies Oy, Espoo (FI)

(72) Inventors: Vinh Van Phan, Oulu (FI); Ling Yu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 131 days.

(21) Appl. No.: 18/405,329

(22) Filed: Jan. 5, 2024

(65) Prior Publication Data

US 2024/0292263 A1 Aug. 29, 2024

(30) Foreign Application Priority Data

Feb. 24, 2023 (GB) ..................................... 2302701

(51) Int. Cl.

| | |
|---|---|
| ***H04W 28/02*** | (2009.01) |
| ***H04W 4/50*** | (2018.01) |
| ***H04W 28/24*** | (2009.01) |

(52) U.S. Cl.

CPC ......... *H04W 28/0215* (2013.01); *H04W 4/50* (2018.02)

(58) Field of Classification Search

CPC ............... H04W 28/0215; H04W 4/50; H04W 28/0268; H04W 28/24

See application file for complete search history.

(56) References Cited

U.S. PATENT DOCUMENTS

| | | | | |
|---|---|---|---|---|
| 9,455,921 | B2 | 9/2016 | Kakadia et al. | |
| 11,212,697 | B2 | 12/2021 | Faheem et al. | |
| 2014/0016464 | A1 * | 1/2014 | Shirazipour | H04L 47/26 370/235 |

(Continued)

FOREIGN PATENT DOCUMENTS

| | | |
|---|---|---|
| CN | 114867122 A | 8/2022 |
| WO | 2016/091298 A1 | 6/2016 |

(Continued)

OTHER PUBLICATIONS

"3rd Generation Partnership Project; Technical Specification Group Services and System Aspects; Telecommunication management; Quality of Experience (QoE) measurement collection; Concepts, use cases and requirements (Release 17)", 3GPP TS 28.404, V17. 3.0, Sep. 2022, pp. 1-12.

(Continued)

*Primary Examiner* — Chris Parry
*Assistant Examiner* — Hassan Abdur-Rahman Khan
(74) *Attorney, Agent, or Firm* — Lippes Mathias LLP

(57) ABSTRACT

An apparatus comprises means for receiving information, from an access node, said information indicating a change to a different quality of experience level of a set of two or more quality of experience levels for at least one service or application supported by the apparatus, the at least one service or application associated with at least one logical connection between the apparatus and a serving network comprising the access node. The apparatus further comprises means for, in response to receiving the information, changing to a quality of service configuration corresponding to the different quality of experience level for the at least one logical connection.

20 Claims, 5 Drawing Sheets

(56) References Cited

U.S. PATENT DOCUMENTS

| | | | | |
|---|---|---|---|---|
| 2015/0222549 | A1* | 8/2015 | Kakadia | H04L 47/283 370/231 |
| 2016/0065453 | A1* | 3/2016 | Bhogal | H04L 47/25 370/235 |
| 2017/0289047 | A1* | 10/2017 | Szilágyi | H04L 41/0853 |
| 2017/0325120 | A1 | 11/2017 | Szilagyi et al. | |
| 2019/0364457 | A1* | 11/2019 | Szilagyi | H04L 47/2425 |
| 2020/0213896 | A1* | 7/2020 | Faheem | H04W 24/10 |
| 2020/0280871 | A1* | 9/2020 | Khirallah | H04W 28/0268 |
| 2022/0213896 | A1* | 7/2022 | Wilson | F04D 17/122 |
| 2022/0322127 | A1* | 10/2022 | Sha | H04L 43/06 |
| 2022/0417799 | A1 | 12/2022 | Schnitzler et al. | |
| 2023/0354089 | A1* | 11/2023 | Liu | H04W 28/0967 |

FOREIGN PATENT DOCUMENTS

| | | | |
|---|---|---|---|
| WO | 2017/176247 | A1 | 10/2017 |
| WO | 2023/004580 | A1 | 2/2023 |

OTHER PUBLICATIONS

"3rd Generation Partnership Project; Technical Specification Group Services and System Aspects; Telecommunication management; Quality of Experience (QoE) measurement collection; Control and configuration (Release 18)", 3GPP TS 28.405, V18.0.0, Sep. 2022, pp. 1-27.

"3rd Generation Partnership Project; Technical Specification Group Services and System Aspects; Telecommunication management; Quality of Experience (QoE)measurement collection; Information definition and transport (Release 17)", 3GPP TS 28.406, V17.0.0, Mar. 2022, pp. 1-11.

Hayyolalam et al., "Dynamic QoS/QoE-aware reliable service composition framework for edge intelligence", Cluster Computing, vol. 25, Mar. 26, 2022, pp. 1695-1713.

"3rd Generation Partnership Project; Technical Specification Group Services and System Aspects; End-to-end multimedia services performance metrics (Release 17)", 3GPP TR 26.944, V17.0.0, Apr. 2022, pp. 1-59.

Search Report received for corresponding United Kingdom Patent Application No. 2302701.4, dated Sep. 7, 2023, 4 pages.

* cited by examiner

APPARATUS, METHODS AND COMPUTER PROGRAMS SUPPORTING DIFFERENT QUALITY OF EXPERIENCE LEVELS

FIELD

This disclosure relates to apparatus, methods, and computer programs and, in particular but not exclusively, relates to apparatus, methods and computer programs supporting different quality of experience levels.

BACKGROUND

A communication system can be seen as a facility that enables communications between two or more communication devices, or provides communication devices access to a data network.

A communication system may be a wireless communication system. Examples of wireless communication systems comprise public land mobile networks (PLMN) operating based on radio access technology standards such as those provided by 3GPP (Third Generation Partnership Project) or ETSI (European Telecommunications Standards Institute), satellite communication systems and different wireless local networks, for example wireless local area networks (WLAN). Wireless communication systems operating based on a radio access technology can typically be divided into cells and are therefore often referred to as cellular systems.

A communication system and associated devices typically operate in accordance with one or more radio access technologies defined in a given specification of a standard, such as the standards provided by 3GPP or ETSI, which sets out what the various entities associated with the communication system and the communication devices accessing or connecting to the communication system are permitted to do and how that should be achieved. Communication protocols and/or parameters which shall be used by communication devices for accessing or connecting to a communication system are also typically defined in standards. Examples of a standard are the so-called LTE (Long-term Evolution) and 5G ($5^{th}$ Generation) standards provided by 3GPP.

SUMMARY

According to a first aspect, there is provide an apparatus comprising: means for receiving information, from an access node, said information indicating a change to a different quality of experience level of a set of two or more quality of experience levels for at least one service or application supported by the apparatus, the at least one service or application associated with at least one logical connection between the apparatus and a serving network comprising the access node; and means for, in response to receiving the information, changing to a quality of service configuration corresponding to the different quality of experience level for the at least one logical connection.

The at least one logical connection may comprise at least one data communication session, at least one radio bearer; or at least one service flow.

The apparatus may comprise means for causing data to be transmitted and/or received on the at least one logical connection, using the quality of service configuration corresponding to the different quality of experience level.

The quality of service configuration for a respective quality of experience level may comprise for one or more quality of service parameters, a respective setting for that quality of experience level.

The information indicating the change to the different quality of experience level may comprise a command.

The apparatus may comprise means for monitoring for the command, said command being a common command for a plurality of communication devices.

The information may indicate a step change to a different quality of experience level of the set of quality of experience levels.

The information may indicate a step change to one of a next better quality of experience level in the set of quality of experience levels or a next lower quality of experience level in the set of quality of experience levels.

The information may indicate a change to a highest quality of experience level in the set of quality of experience levels or a lowest quality of experience level in the set of quality of experience levels.

The information may identify the quality of experience level.

The apparatus may comprise means for causing a response to be sent to the access node in response to receiving the information from the access node.

The response may comprise a one bit indicator, a value of which is changed each time there is a change of a quality of service configuration corresponding to a different quality of experience level.

The apparatus may comprise means for receiving associated quality of service configuration information for each of the quality of experience levels of the set of quality of experience levels.

The apparatus may comprise means for updating an application layer of one or more quality of service settings in response to said information.

The application may comprise an extended reality application.

One or more of the means may be provided by at least one processor and at least one memory storing instructions executable by the at least one processor.

The apparatus may be or provided in a communication device.

According to another aspect, there is provided an apparatus comprising at least one processor and at least one memory storing instructions that, when executed by the at least one processor, cause the apparatus at least to: receive at a communication device information, from an access node, said information indicating a change to a different quality of experience level of a set of two or more quality of experience levels for at least one service or application, the at least one service or application associated with at least one logical connection between the apparatus and a serving network comprising the access node; and in response to receiving the information, change to a quality of service configuration corresponding to the different quality of experience level for the at least one logical connection.

According to another aspect, there is provided a method comprising: receiving at a communication device information, from an access node, said information indicating a change to a different quality of experience level of a set of two or more quality of experience levels for at least one service or application, the at least one service or application associated with at least one logical connection between the apparatus and a serving network comprising the access node; and in response to receiving the information, changing to a quality of service configuration corresponding to the different quality of experience level for the at least one logical connection.

The at least one logical connection may comprise at least one data communication session, at least one radio bearer; or at least one service flow.

The method may comprise causing data to be transmitted and/or received on the at least one logical connection, using the quality of service configuration corresponding to the different quality of experience level.

The quality of service configuration for a respective quality of experience level may comprise for one or more quality of service parameters, a respective setting.

The information indicating the change to the different quality of experience level may comprise a command.

The method may comprise monitoring for the command, said command being a common command for a plurality of communication devices.

The information may indicate a step change to a different quality of experience level of the set of quality of experience levels.

The information may indicate a step change to one of a next better quality of experience level in the set of quality of experience levels or a next lower quality of experience level in the set of quality of experience levels.

The information may indicate a change to a highest quality of experience level in the set of quality of experience levels or a lowest quality of experience level in the set of quality of experience levels.

The information may identify the quality of experience level.

The method may comprise causing a response to be sent to the access node in response to receiving the information from the access node.

The response may comprise a one bit indicator, a value of which is changed each time there is a change of a quality of service configuration corresponding to a different quality of experience level.

The method may comprise receiving associated quality of service configuration information for each of the quality of experience levels of the set of quality of experience levels.

The method may comprise updating an application layer of one or more quality of service settings in response to said information.

The application may comprise an extended reality application.

The method may be performed by an apparatus. The apparatus may be or provided in a communication device.

The apparatus may comprise at least one processor and at least one memory storing instructions that, when executed by the at least one processor, cause the apparatus to perform any of the previous methods.

According to another aspect, there is provided an apparatus comprising: means for determining that there is to be a change to a different quality of experience level of a set of two or more quality of experience levels for at least one service or application supported by at least one communication device, the at least one service or application associated with at least one logical connection between each of the at least one communication device and a serving network comprising an access node; and means for causing information to be transmitted from the access node to the at least one communication device when there is to be a change to a different quality of experience level for at least one service or application supported by the at least one communication device, the information causing a change to a quality of service configuration corresponding to the different quality of experience level for the at least one logical connection.

The at least one logical connection may comprise at least one data communication session, at least one radio bearer; or at least one service flow.

The apparatus may comprise means for causing data to be transmitted and/or received on the at least one logical connection, using the quality of service configuration corresponding to the different quality of experience level.

The means for determining that there is to be a change to a different quality of experience may be for determining that there is to be a change to different quality of experience in response to a trigger received from a control function of the serving network.

The apparatus may comprise means for causing a message to be provided to the serving network in response to determining that there is to be a change to a different quality of experience.

The means for determining that there is to be a change to a different quality of experience may be for determining that there is to be a change to different quality of experience in response to an addition or admission, a modification or reconfiguration, a removal or release, or a handover of one or more communication devices including the at least one communication device.

The means for determining that there is to be a change to a different quality of experience may be for determining that there is to be a change to different quality of experience in response to an addition or admission, a modification or reconfiguration, a removal or release, or a handover, of one or more logical connections including the at least one logical connection between each of the at least one communication device and the serving network.

The quality of service configuration for a respective quality of experience level may comprise for one or more quality of service parameters, a respective setting for that quality of experience level.

The information indicating the change to the different quality of experience level may comprise a command.

The apparatus may comprise comprising means for causing the command to be transmitted to the at least one communication device, said command being a common command.

The information may indicate a step change to a different quality of experience level of the set of quality of experience levels.

The information may indicate a step change to one of a next better quality of experience level in the set of quality of experience levels or a next lower quality of experience level in the set of quality of experience levels.

The information may indicate a change to a highest quality of experience level in the set of quality of experience levels or a lowest quality of experience level in the set of quality of experience levels.

The information may identify the quality of experience level.

The apparatus may comprise means for receiving a response from each of the at least one communication device indicating receipt of the information by the respective communication device.

The response may comprise a one bit indicator, a value of which is changed each time there is a change of a quality of service configuration corresponding to a different quality of experience level.

The apparatus may comprise means for causing associated quality of service configuration information for each of the quality of experience levels of the set of quality of experience levels to be transmitted to the at least one communication device.

The application may comprise an extended reality application.

One or more of the means may be provided by a at least one processor and at least one memory storing instructions executable by the at least one processor.

The apparatus may be provided in or be an access node.

According to another aspect, there is provided an apparatus comprising at least one processor and at least one memory storing instructions that, when executed by the at least one processor, cause the apparatus at least to: determine that there is to be a change to a different quality of experience level of a set of two or more quality of experience levels for at least one service or application supported by at least one communication device, the at least one service or application associated with at least one logical connection between each of the at least one communication device and a serving network comprising an access node; and cause information to be transmitted from an access node to the at least one communication device when there is to be a change to a different quality of experience level for at least one service or application supported by the at least one communication device, the information causing a change to a quality of service configuration corresponding to the different quality of experience level for the at least one logical connection.

According to another aspect, there is provided a method comprising: determining that there is to be a change to a different quality of experience level of a set of two or more quality of experience levels for at least one service or application supported by at least one communication device, the at least one service or application associated with at least one logical connection between each of the at least one communication device and a serving network comprising an access node; and causing information to be transmitted from an access node to the at least one communication device when there is to be a change to a different quality of experience level for at least one service or application supported by the at least one communication device, the information causing a change to a quality of service configuration corresponding to the different quality of experience level for the at least one logical connection.

The at least one logical connection may comprise at least one data communication session, at least one radio bearer; or at least one service flow.

The method may comprise causing data to be transmitted and/or received on the at least one logical connection, using the quality of service configuration corresponding to the different quality of experience level.

The method may comprise determining that there is to be a change to a different quality of experience in response to a trigger received from a control function of the serving network.

The method may comprise causing a message to be provided to the serving network in response to determining that there is to be a change to a different quality of experience.

The method may comprise determining that there is to be a change to a different quality of experience in response to an addition or admission, a modification or reconfiguration, a removal or release, or a handover of one or more communication devices including the at least one communication device.

The method may comprise determining that there is to be a change to different quality of experience in response to an addition or admission, a modification or reconfiguration, a removal or release, or a handover, of one or more logical connections including the at least one logical connection between each of the at least one communication device and the serving network.

The quality of service configuration for a respective quality of experience level may comprise for one or more quality of service parameters, a respective setting for that quality of experience level.

The information indicating the change to the different quality of experience level may comprise a command.

The method may comprise causing the command to be transmitted to the at least one communication device, said command being a common command.

The information may indicate a step change to a different quality of experience level of the set of quality of experience levels.

The information may indicate a step change to one of a next better quality of experience level in the set of quality of experience levels or a next lower quality of experience level in the set of quality of experience levels.

The information may indicate a change to a highest quality of experience level in the set of quality of experience levels or a lowest quality of experience level in the set of quality of experience levels.

The information may identify the quality of experience level.

The method may comprise receiving a response from each of the at least one communication device indicating receipt of the information by the respective communication device.

The response may comprise a one bit indicator, a value of which is changed each time there is a change of a quality of service configuration corresponding to a different quality of experience level.

The method may comprise causing associated quality of service configuration information for each of the quality of experience levels of the set of quality of experience levels to be transmitted to the at least one communication device.

The application may comprise an extended reality application.

The method may be performed by an apparatus. The apparatus may be provided in or be an access node.

The apparatus may comprise at least one processor and at least one memory storing instructions that, when executed by the at least one processor, cause the apparatus to perform any of the previous methods.

According to a further aspect, there is provided a computer program comprising instructions, which when executed by an apparatus, cause the apparatus to perform any of the methods set out previously.

According to a further aspect, there is provided a computer program comprising instructions, which when executed cause any of the methods set out previously to be performed.

According to an aspect there is provided a computer program comprising computer executable code which when cause any of the methods set out previously to be performed.

According to an aspect, there is provided a computer readable medium comprising program instructions stored thereon for performing at least one of the above methods.

According to an aspect, there is provided a non-transitory computer readable medium comprising program instructions which when executed by an apparatus, cause the apparatus to perform any of the methods set out previously.

According to an aspect, there is provided a non-transitory computer readable medium comprising program instructions which when executed cause any of the methods set out previously to be performed.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF FIGURES

Some examples will now be described in further detail, by way of illustration only, with reference to the accompanying drawings, in which.

DETAILED DESCRIPTION

In the following certain embodiments are explained with reference to communication devices capable of communication via a wireless cellular system and mobile communication systems serving such communication devices. Before explaining in detail, the exemplifying embodiments, certain general principles of a wireless communication system, access systems thereof, and communication devices are briefly explained with reference to FIGS. 1, 2, and 3 to assist in understanding the technology underlying the described examples.

Figure 1:
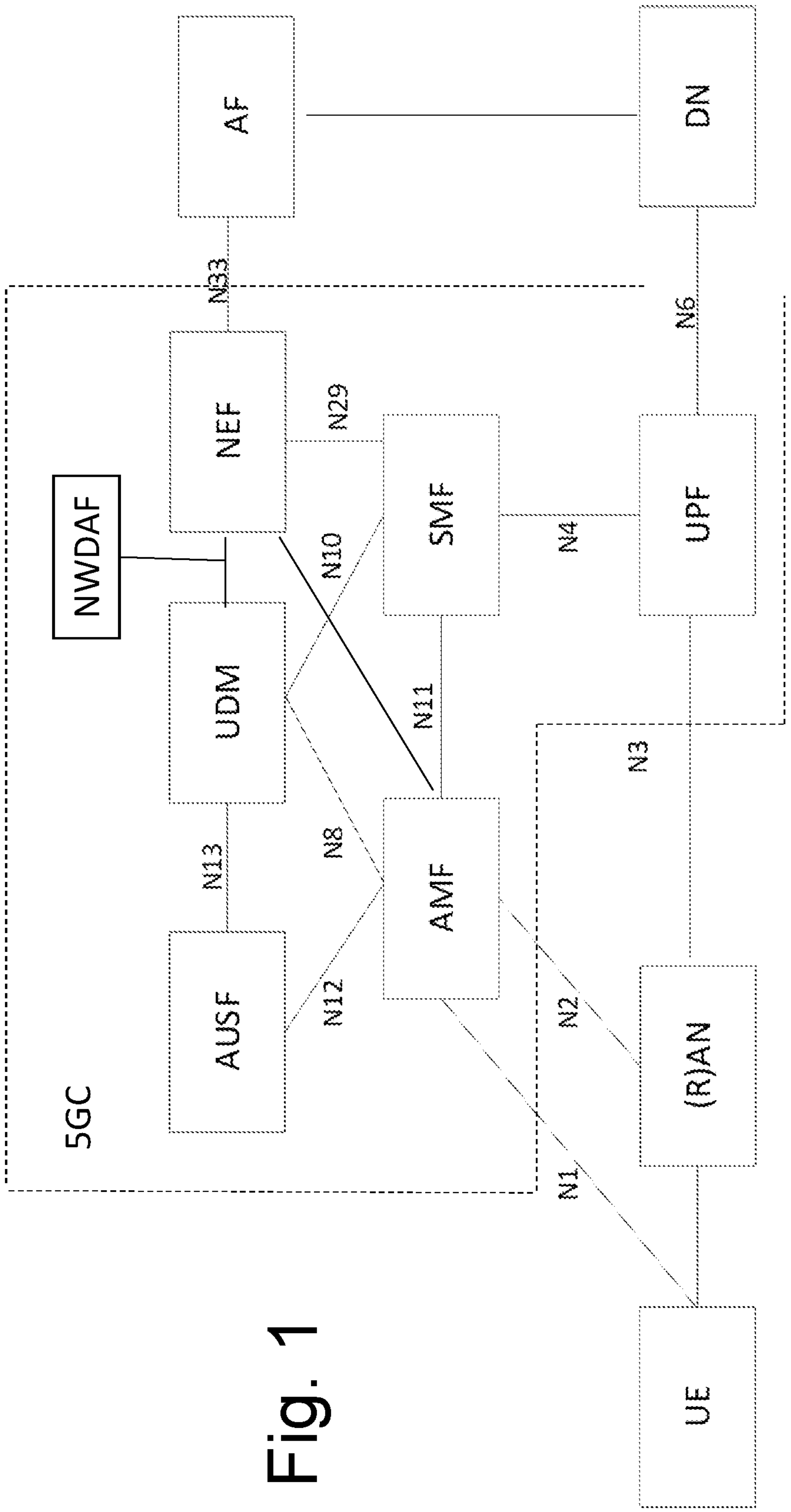
FIG. 1 shows a schematic representation of a 5G system.

FIG. 1 shows a schematic representation of a communication system operating based on a 5$^{th}$ generation radio access technology (generally referred to as a 5G system (5GS)). The 5GS may a (radio) access network ((R) AN), a 5G core network (5GC), one or more application functions (AF) and one or more data networks (DN). A user equipment may access or connect to the one or more DNs via the 5GS.

The 5G (R) AN may comprise one or more base stations or radio access network (RAN) nodes, such as a gNodeB (gNB). A base station or RAN node may comprise one or more distributed units connected to a central unit.

The 5GC may comprise various network functions, such as an access and mobility management function (AMF), a session management function (SMF), an authentication server function (AUSF), a user data management (UDM), a user plane function (UPF) a network data analytics function (NWDAF) and/or a network exposure function (NEF).

Figure 2:
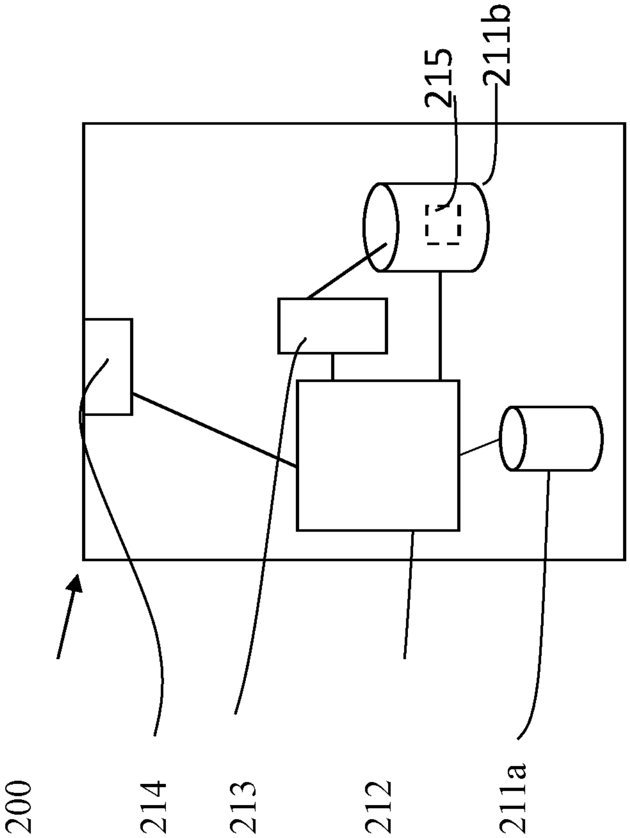
FIG. 2 shows a schematic representation of an apparatus.

FIG. 2 illustrates an example of an apparatus 200. The apparatus 200 may be provided in a base station or other access node. The apparatus may be provided in a communication device. The apparatus 200 may have at least one processor and at least one memory storing instructions that, when executed by the at least one processor cause one or more functions to be performed. In this example, the apparatus may comprise at least one random access memory (RAM) 211*a*, and/or at least one read only memory (ROM) 211*b*, and/or at least one processor 212, 213 and/or an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects.

Figure 3:
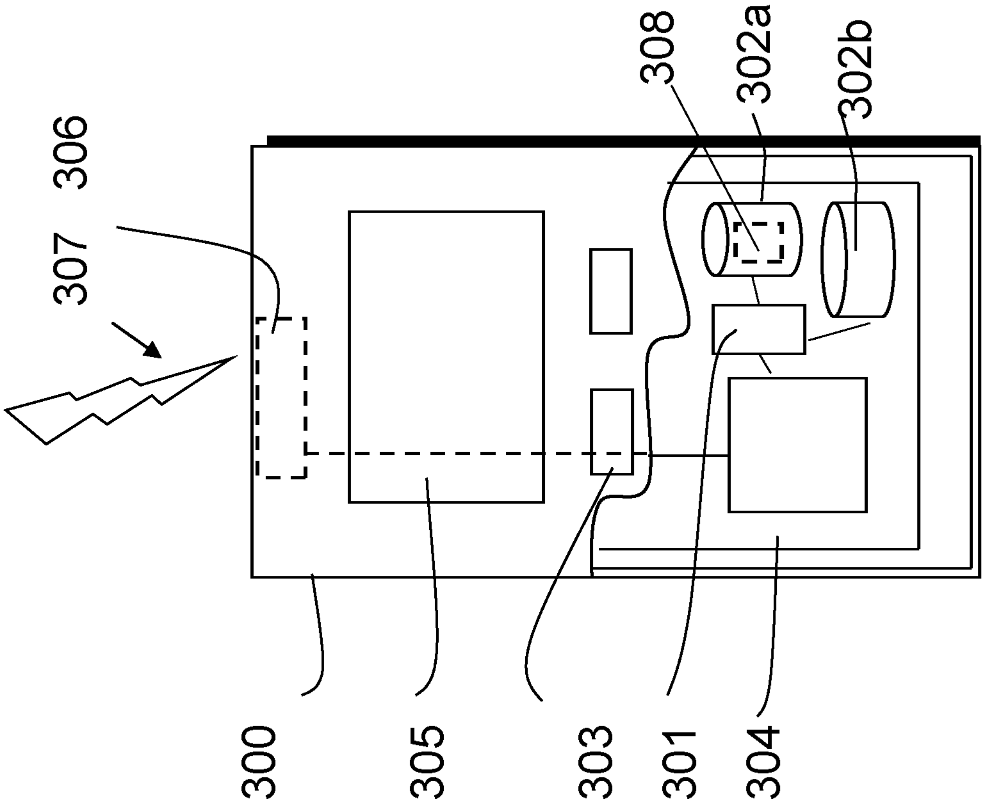
FIG. 3 shows a schematic representation of a user equipment.

FIG. 3 illustrates an example of a communication device 300. The communication device 300 may be any device capable of sending and receiving radio signals. The communication device may be an XR (extended reality) device such as a headset or may be capable of supporting XR. Non-limiting examples of a communication device 300 comprise a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The communication device 300 may send or receive, for example, radio signals carrying communications. The communications may be one or more of voice, electronic mail (email), text message, multimedia, data, machine data and so on.

The communication device 300 may receive radio signals over an air or radio interface 307 via a transceiver apparatus 306. The transceiver apparatus 306 may be provided for example by means of a radio part and associated antenna arrangement. The antenna arrangement may be arranged internally or externally to the mobile device and may include a single antenna or multiple antennas. The antenna arrangement may be an antenna array comprising a plurality of antenna elements.

The communication device 300 may be provided with at least one processor 301, and/or at least one memory. The at least one memory may be at least one ROM 302*a*, and/or at least one RAM 302*b*. Other possible components 303 may be provided for use in software and hardware aided execution of tasks it is designed to perform, including control of access to and communications with access systems, such as the 5G RAN and other communication devices. The at least one processor 301 is coupled to the RAM 302*b* and the ROM 302*a*. The at least one processor 301 may be configured to execute instructions of software code 308. Execution of the instructions of the software code 308 may for example allow to the communication device 300 perform one or more operations. The software code 308 may be stored in the ROM 302*a*. It should be appreciated that in other embodiments, any other suitable memory may be alternatively or additionally used with the ROM and/or RAM examples set out above.

The at least one processor 301, the at least one ROM 302*a*, and/or the at least one RAM 302*b* can be provided on an appropriate circuit board, in an integrated circuit, and/or in chipsets. This feature is denoted by reference 304.

The communication device 300 may optionally have a user interface such as keypad 305, touch sensitive screen or pad, combinations thereof or the like. Optionally, the communication device may have one or more of a display, a speaker and a microphone.

In the following examples, the term UE or user equipment is used. This term encompasses any of the example of communication device 300 previously discussed and/or any other communication device.

An example of wireless communication systems are architectures standardized by the 3rd Generation Partnership Project (3GPP). The currently radio access technology being standardized by 3GPP is often referred to as 5G or NR. Other radio access technologies standardized by 3GPP include long term evolution (LTE) or LTE Advanced Pro of the Universal Mobile Telecommunications System (UMTS). Wireless communication systems generally include access networks, such as radio access networks operating based on a radio access technology that include base stations or a radio access network nodes. Wireless communication systems may also include other types of access networks, such as a wireless local area network (WLAN) and/or a WiMAX (Worldwide Interoperability for Microwave Access) network. It should be understood that example embodiments may also be used with standards for future radio access technologies such as 6G and beyond.

Some embodiments may support services with relatively high bandwidth demands. Some embodiments may additionally or alternatively support services with variable bandwidth demands. A service may be a service provided by a serving network. The serving network includes the access node or base station. A service flow may between a UE and the serving network.

Some embodiments may support advanced real-time or interactive multi-media applications and services with different resolutions may be considered. One example of such application is XR applications.

For these types of applications and services, a QoE (quality of experience) is better if a higher resolution can be provided. The higher the better but this may depend on the ability of the serving network to support a higher resolution. This may depend on available bandwidth or resources. The serving network should be able to serve with at least a certain QoS level corresponding to, e.g., an agreed minimum resolution level between the UE and the serving network. This may for example be in accordance with a service level agreement.

XR is an umbrella term and includes at least the following types of reality:

Augmented Reality (AR) where virtual objects are added to real world environments;

Virtual Reality (VR) where visual and audio scenes are combined with real-world locations; and Mixed Reality (MR) where haptics and interactions are added.

Some embodiments may be applied in 5G applications or beyond.

Some embodiments may enable relatively fast and/or scalable QoE (quality of experience). It is expected that increases in the carrier frequency (e.g. in frequency range 2 F2), increases in bandwidth, and smaller cells may result in a cell providing a higher data rate to a UE in the cell.

QoE is an end to end measure between user and access network, satisfaction of the user while QoS measures distinct parameters.

Quality of Experience (QoE) is the overall acceptability of an application or service, as perceived subjectively by the end-user.

The Quality of Experience may include the complete end-to-end system effects (client, terminal, network, services infrastructure, etc).

The overall acceptability may be influenced by user expectations and context.

In some embodiments, QoE may be controlled by parameters that are reasonably expected to be under the control of the service provider.

QoE indicates performance metrics as expressed from the end service user's point of view. They can be required or reported by the common users, and may be stated irrespective of their measurability.

In general, a service provider will set service requirements in line with the end-user's expected QoE. These need to be translated into parameters or metrics that the service provider can control or measure. QoE metrics may be mapped to QoS parameters.

QoE is used can be regarded as performance characteristics that have most relevance to end users. QoE may be mapped to QoS characteristics.

3GPP TR26.944 relates to end-to-end multimedia services performance metrics such as QoE.

Some example QoE parameters are:

Service non-access

Service failure

Service setting-up time

Re-buffering

Image corruption

Edge noise

Blurriness

Colour reproduction accuracy

Blockiness

Incontinuous image with block

Freeze image

Audio quality

Audio/Video synchronization error

A given QoE level may be associated with particular values of one or more of these parameters and/or any other suitable parameter.

There may be a shift from meeting QoS (quality of service) to providing QoE. This may for example be the case for at least some multimedia services. By way of example, such a multimedia service may be XR. Meeting basic QoS requirements for some applications and services may not be an issue but providing a required QoE may be an issue. This may be because there may be many folds of bandwidth needed for providing a full or desired level of user experience for certain applications and services compared to that needed for providing a more basic level of user experience. For example, a full or desired QoE may require many times or a multiple of the amount of bandwidth or bit rate needed for providing a basic level of QoE. For example, 2 Mbps is needed for comprehensible voice and video quality but 10×2 Mbps=20 Mbps is needed for high resolution voice and video of the same application for a full level of QoE. There can be one or more levels of QoE resolution in between the lowest QoE experience level and the highest QoE experience level. Thus, there may be different levels of user experience in between the full level and the more basic level.

The user experience may be perceived by the end user on the application level. In order for the serving access network to be able to control QoE via the network connection provided to the end-user UE, certain awareness of respective end-user applications and services as well as possible interaction between the application level and the serving network may be expected and assumed.

For example, the application level may be able to adapt to, e.g., minimum GBR (guaranteed bit rate) of the network connection provided for respective application(s) and thus may need to be updated with this information by the serving network. The application level may for example be able to adapt by changing resolution or source coding of at least some QoS flows, switch on/off some media-enriching QoS flows, changing between 2D and 3D, and/or the like. The provided minimum GBR in this example may be above the required minimum GBR for the basic QoE level and thus corresponding to a QoE level above the basic QoE level.

In another example, the serving network may be allowed to adapt, e.g., bit rate, latency, and/or priority provided to individual QoS flows of respective application(s) for a provisioned QoE level. This may depend on, e.g., a provided minimum GBR, available network capability, affordable network capability, and/or capacity in general.

A required QoE level for respective application(s) and service(s) may be provided by setting one or more QoS parameters, and/or one or more constraints such as maximum and/or minimum bit rates, packet delays and delay jitters, packet loss rates, packet priorities, allocation and retention priorities, and so forth, and different constraints thereof. QoS configuration(s) may be set for the network connection(s), bearer service(s) and/or QoS flow(s) thereof with mapping rules as a part of QoS configuration(s). This means that there can be different levels of resolution for such QoS configurations. The network connection level may also be on the basis of a data communication session or a PDU (protocol data unit) session for example.

There may be a need for relatively fast control or reconfiguration of such QoS configurations for different applications and services on the fly. This may be the case for example in advanced 5G and 6G applications. This may be a result of the targeted QoE level needing to be dynamically adjusted on the fly. Applications and services such as XR may be considered to be extreme or relatively high real-time and/or low latency.

XR or similar applications and/or services may have relatively high and variable bandwidth demands. An event such as an addition (admission) or a removal (release or handover) of an XR UE may have significant negative or positive impacts on the QoE-driven bandwidth the gNB may provide to at least some of other UE(s). This may also impact therefore the QoE of the other UEs. In some embodiments, a XR UE may cause a decrease of QoE of all other gaming UEs for example. In this example, the XR UE may not be one of the gaming UEs. A UE supporting one type of application or service may have an impact on one or more other UEs supporting a different service or application. For example, a handover of a UE supporting one application or service may allow the QoE to be increased for one or more other UEs supporting a different service or application. Likewise, the admission to a cell of a UE supporting one application or service may require the QoE to be decreased for one or more other UEs supporting a different service or application.

Similarly, an addition or admission, a modification or reconfiguration, a removal or release, or a handover, of one or more logical connections supporting one service or application may impact one or more logical connections supporting a different service or application.

For an illustrative numerical example, the gNB is able to serve at most 2 XR UEs with full level QoE, 4 XR UEs with a mid-level QoE, and 8 XR UEs with basic level QoE.

Scenario 1:2 XR UEs are served with the full level. On admitting a third XR UE, there is a need to reconfigure the first and second XR UEs and configure the third XR UEs for the mid-level QoE.

Scenario 2:5 XR UEs are served with the basic level. Upon releasing the fifth XR UE, there is a need to reconfigure the rest of 4 XR UEs from the basic level QoE to the mid-level QoE.

Some embodiments may provide relatively fast control and/or reconfiguration of QoS configurations for bandwidth demanding applications and/or services. The fast control and/or reconfiguration of QoS configurations may need to be applied for a number of active UEs by the serving gNB simultaneously or generally at the same time.

In current cellular systems such as LTE and NR 5G, services are provided to the UE via radio bearer (RB) service. Each radio bearer has a corresponding QoS configuration and a change to QoS configuration of an established RB will result in a reconfiguration towards the UE. This is based on RRC signalling and may be considered as slow control.

The QoS flow concept in current 3GPP NR 5G standards enables a fine resolution for QoS configuration as well as QoS differentiation among different QoS flows mapped on the same or different RB(s). Each QoS flow has a corresponding QoS class (5QI-5G QoS identifier) and configuration (QoS profile). The QoS flows are classified into GBR and non-GBR QoS flows. The reconfiguration of QoS constraints such as maximum and minimum bit rates for a QoS flow is based on slow control of using NAS (non-access stratum) or RRC level signalling.

Some embodiments may relate to a hybrid class of QoS flows between GBR and non-GBR, wherein a QoS flow may require GBR but tolerate different GBRs corresponding to different QoE levels for the corresponding application and/or service.

In some embodiments, the gNB may use dedicated and/or common QoE-driven short command(s). The command(s) may trigger a relatively fast adaptation or QoS reconfiguration. This may be of the QoS configuration(s) of one or more radio connection(s), RB service(s), and/or QoS flow(s) to at one or more targeted UE(s). This may correspond to a next targeted QoE level(s) for targeted application(s) and/or service(s).

In some embodiments, the QoS configuration for a network connection, a RB service, and/or a service QoS flow for a targeted application or service of the UE may comprise a set of QoS configurations or QoS configuration settings. Each set may correspond to a target QoE level. This set may have two or more levels. The levels may comprise a basic (minimum or lowest) level and a full (maximum or highest) level and optionally one or more intermediate levels. These levels are the levels the serving gNB may provide to the UE for the targeted application and/or service, as provisioned by the network. The number of levels may be system dependent. For example, up to 16 different levels may be provided. These 16 levels may be associated with a 4-bit indication. It should be appreciated that 16 is only one example of the number of different levels. Different embodiments may be associated with different numbers of QoE levels including more than 16 levels or fewer than 16 levels.

The network connection may correspond to the PDU session level resolution for instance.

In one example, it is provisioned that for an example targeted XR application and/or service, a UE may need a network connection with a minimum GBR of 100 Mbps for the basic QoE level, 200 Mbps for a mid QoE level and 400 Mbps for the full QoE level. In this example, the QoS configuration is resolved on the network connection level and consists of 3 QoS configuration settings of the minimum GBR mapped on the provisioned QoE levels the network may provide to the UE.

In another example, a finer resolution of the QoS configuration on the RB service level or QoS flow level may be applied. The QoS configuration for a RB or a QoS flow to serve the targeted application and/or service may consist of a number of different QoS configurations with different settings of QoS parameters. The QoS parameters may be one or more of bit rate, packet delay budget, averaging window, data burst size, priority, RB mapping for QoS flow, and/or the like. Each QoS configuration may correspond to a provisioned QoE level ranging from the lowest QoE level to the full QoE level. Thus, the UE may be configured by the serving network with a QoS configuration comprising a number of different QoS configurations. Different QoS configurations having one or more different QoS parameters for the network connection, RB service or QoS flow provided for serving the targeted application and service, each corresponding to a provisioned QoE level identified with QoE index for examples.

The different QoS configurations correspond to the different QoE levels for the targeted application and/or service. The different QoS configurations extend to the UE as well as the application level. This is to enable faster QoE driven control and adaptation.

The gNB or base station may then control which QoS configuration or configuration setting, out of the QoS configurations included in the QoS configuration, needs to be used by the UE. The needed QoS configuration or configuration setting is used for the network connection, the RB, and/or the QoS service flow for a next target QoE level. The next target QoE level may be determined and provided by the network. This may be done on-the-fly. This may be done without needing to perform a reconfiguration of the network connection, the RB, and/or the QoS service flow.

In some embodiments, the base station may send a dedicated QoE command to the UE indicating which QoE level is the next targeted QoE level for the respective network connection, the RB and/or the QoS flow. The command can be used for mapping or determining which of the QoS configurations or configuration settings needs to be used by the UE. The command may indicate which QoE level is the next targeted QoE level for the respective RB and/or the service flow.

In some embodiments, the base station may send a common QoE command to all targeted UEs indicating a targeted change to the current QoE level(s). This indicates a change to the current QoS configuration(s) or configuration setting(s) for relevant network connection(s), RB(s) and/or QoS service flow(s) of the targeted UEs. The targeted UEs can thus determine the next targeted QoE level(s) as well as the next targeted QoS configuration(s) or configuration setting(s) to be used for the relevant network connection(s), RB(s) or QoS service flow(s).

For examples, this common command may indicate:

i. To decrease QoE level to the lowest QoE level and therefore to use QoS configuration or configuration setting corresponding to the lowest QoE level;

ii. To increase QoE level to the highest QoE level and therefore to use QoS configuration or configuration setting corresponding to the highest QoE level;

iii. To decrease QoE level by a step down to max (the lowest QoE level, the current QoE level-step down) and therefore to use QoS configuration or configuration setting corresponding to the next QoE level equal to max (the lowest QoE level, the current QoE level-step-down). In other words the QoE level is decreased by one unless the current level is the lowest level. If the current level is the lowest level, then there is no change in the level; or iv. To increase QoE level by a step up to min (the highest QoE level, the current QoE level+step up) and therefore to use QoS configuration or configuration setting corresponding to the next QoE level equal to min (the highest QoE level, the current QoE level+step up). In other words the QoE level is increased by one unless the current level is the highest level. If the current level is the highest level, then there is no change in the level.

The step down and step up are predefined/configured positive integers. By way of example, the integer may be 1. In other embodiments, the integer may have a different value. In other embodiments, the integer may be varied by the base station.

In other embodiments, the specific QoE level to be used may be signalled by the base station.

Figure 4:
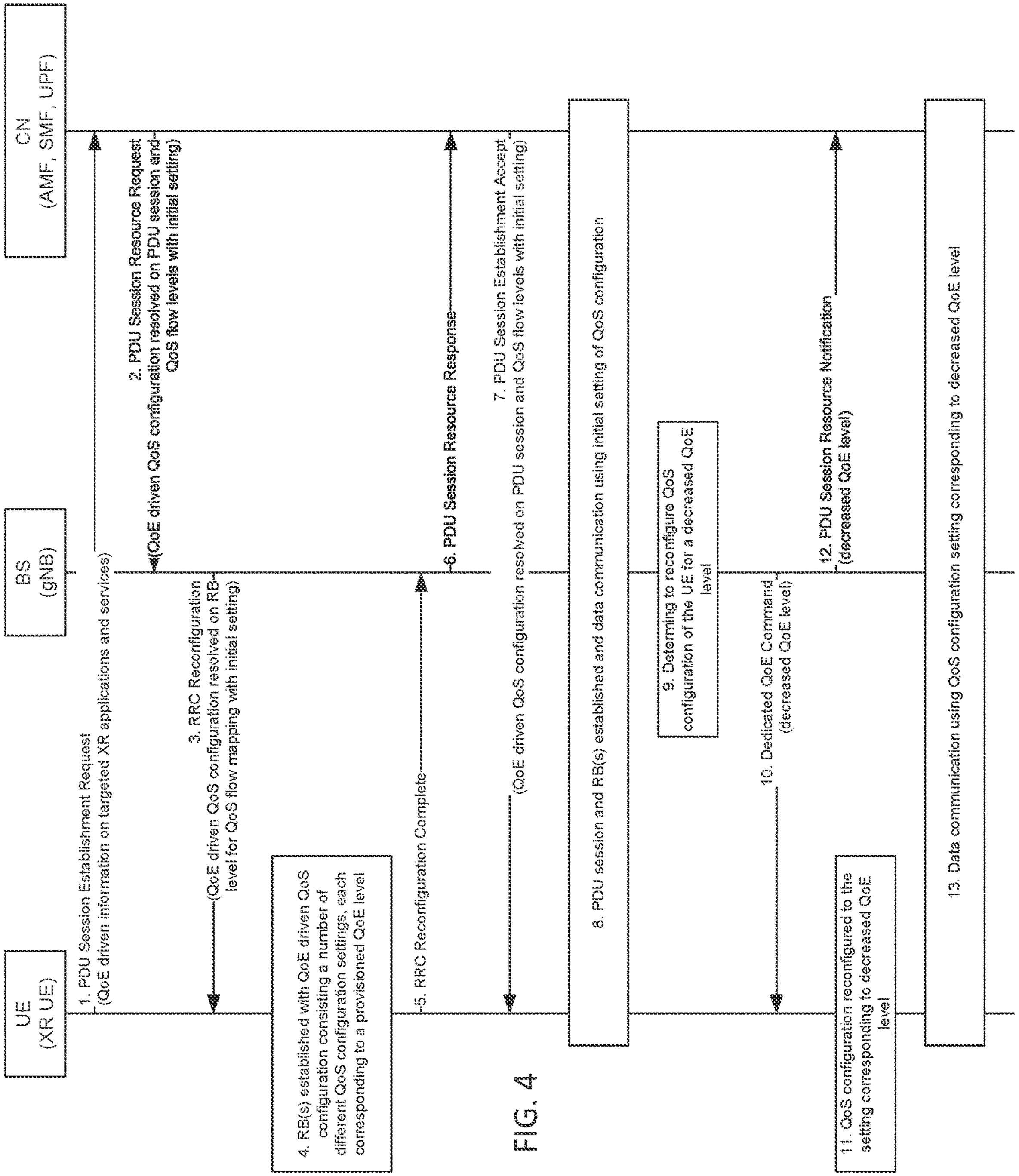
FIG. 4 shows a first signal flow of some embodiments.

Reference is made to FIG. 4 which shows different options for initially configuring QoE driven QoS configurations to the UE and gNB for different resolutions. This Figure shows an example in which the gNB is triggered to issue a dedicated QoE command to the UE to decrease the QoE level for an ongoing application and/or service. This results in reconfiguring the QoS configuration for the network connection, RB or QoS flow associated with the ongoing application and/or service.

As referenced 1, the UE sends a PDU session establishment request to the core network CN. This comprises QoE driven information on the targeted XR application and/or service.

In some embodiments, the QoS configuration of a QoS service flow may comprise a number N of different QoS configurations belonging to different QoS classes or profiles, each corresponding to a provisioned QoE level identified with incremental index from the lowest level to the highest level, e.g., (1, . . . , N). The UE may be provided with the configuration settings for each QoE level in advance.

In some embodiments, the QoS configuration of a QoS service flow may comprise a number N of different QoS configurations or settings belonging to the same QoS class or profile. In this case, different QoS configuration settings may consist of different constraints such as bit rates, packet delays or priorities.

In some embodiments, the dedicated command may be implemented using the existing L1 DCI (layer 1 downlink control information) on PDCCH (physical downlink control channel) with an associated control element or a L2 MAC CE (layer 2 media access control control element).

As referenced 2, the CN sends a PDU session resource request to the base station. This comprises QoE driven QoS configuration resolved on the PDU-session and QoS flow levels with an initial setting.

As referenced 3, the base station sends a RRC reconfiguration message to the UE. This comprises the QoE driven QoS configuration resolved on the RB level for QoS flow levels with the initial setting.

As referenced 4, the UE establishes the RB(s) with the QoE driven QoS configuration settings, as configured by the base station as referenced 3. The QoS configuration settings correspond to the provided QoE level.

As referenced 5, the UE sends RRC reconfiguration complete message to the base station.

As referenced 6, the base station sends a PDU session resource response to the CN.

As referenced 7, the CN provides a PDU session establishment accept message to the UE via the base station. The message comprises QoE driven QoS configuration resolved on the PDU-session and QoS flow levels with an initial setting.

As referenced 8, the PDU session and RB(s) are established between the UE and the CN via the base station. Data communication uses the QoS configuration initial settings.

As referenced 9, the base station determines that the QoS configuration of the UE is to be reconfigured for a decreased QoE level.

As referenced 10, the base station sends a dedicated QoE command to the UE. This command indicates to the UE the deceased QoE level.

As referenced 11, the UE reconfigures the QoS configuration to the settings corresponding to the decreased QoE level.

As referenced 12, the base station sends a PDU session resource notification to the CN. This will indicate the decreased QoE level.

As referenced 13, the data communication between the UE and CN via the base station uses the QoS configuration settings corresponding to the decreased QoE level.

Figure 5:
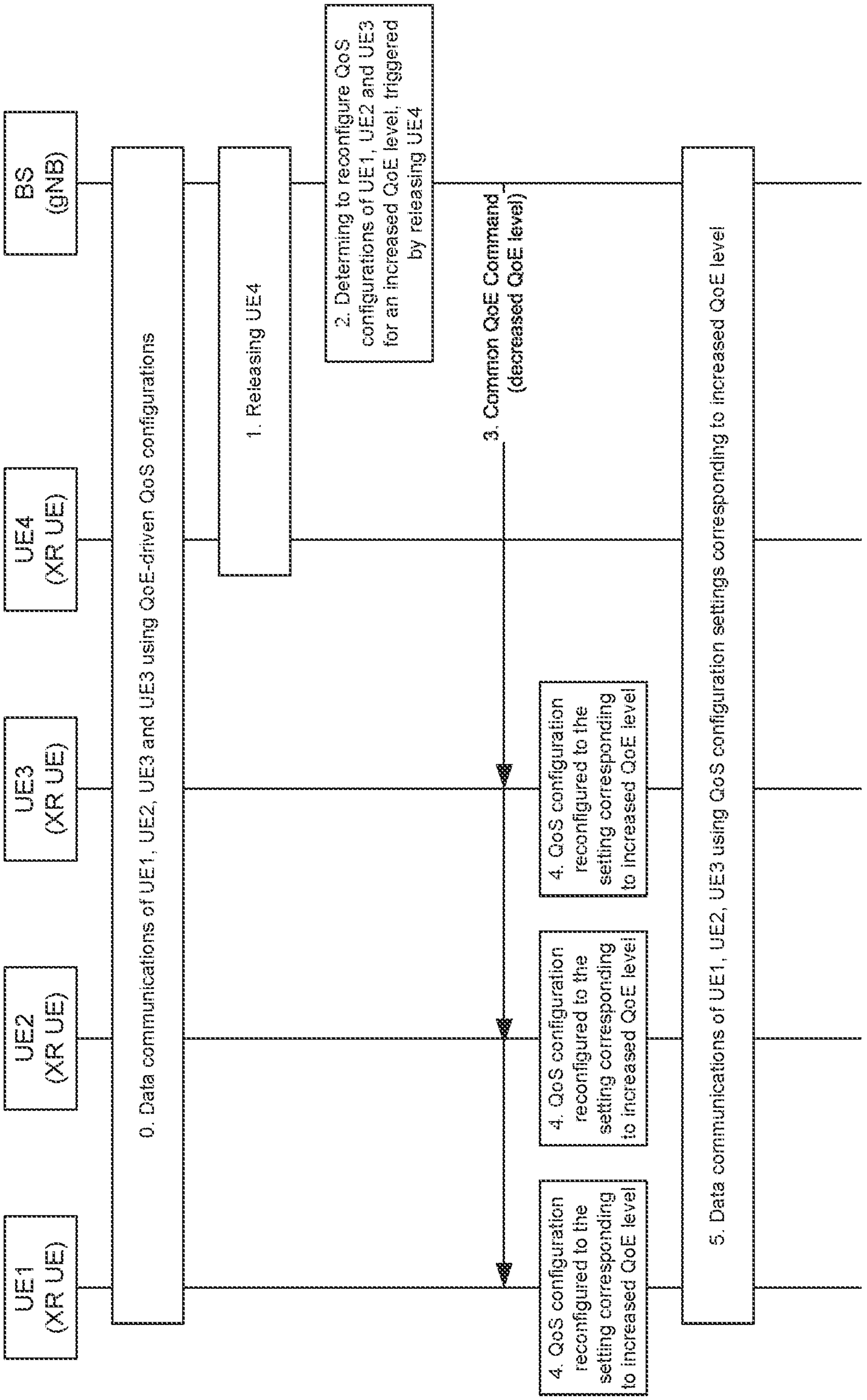
FIG. 5 shows a second signal flow of some embodiments.

FIG. 5 shows an example in which the gNB is triggered to issue a common QoE command to all the ongoing XR UEs to increase the QoE level for the ongoing XR application and/or service upon a release of a XR UE.

As referenced 0, data communications between the base station on the one hand and each of four UEs UE1, UE2, UE3 and UE4 used QoE driven QoS configurations. In this example, each of the UEs has the same QoE driven QoS configurations. However, in other examples different ones of the UEs may have different QoE driven QoS configurations.

As referenced 1, the connection between UE4 and the base station is released.

As referenced 2, the base station determines that the QoS configurations of UE1, UE2 and UE3 are to be reconfigured to an increased QoE level. This is triggered by the releasing of UE4.

As referenced 3, a common QoE command is sent from the base station to UE1, UE2 and UE3. This may be multicast or separately sent to each UE. The common QoE command may indicate the increased QoE level.

As referenced 4, each of UE1, UE2 and UE3 reconfigures the QoS configuration setting to those corresponding to the increased QoE level.

As referenced 5, data communications between the base station on the one hand and each of UE1, UE2, and UE3 use the QoE driven QoS configurations for the increased QoE level.

In some embodiments, the common command may be implemented using the existing L1 DCI, the short message addressed to the common P-RNTI (paging radio network temporary identifier) on the PDCCH, and/or in a frequent system information block (SIB) such as a MIB (master information block) or any other SIB with one or more respective control elements. In another option, an exclusive RNTI similar to the P-RNTI may be allocated for the common control and in this case a MAC CE for this command may be used.

In some embodiments, the common command may be for all relevant network connection(s), RB(s) and/or QoS service flow(s) of all relevant UEs. The common command applies to QoE-driven configuration and control. In some embodiments, the common command may be an up or down command with a default step up and step down equal to 1 or the step may be indicated in the command.

In some embodiments, step up or step down is indicated in the common command. In case no step up or step down value is indicated in the common command, a default value of step up or step down (equal to 1 for example) is applied.

In some embodiments, the common command may be for a determined group of UEs or a determined group of QoS classes indicated explicitly in the command.

In some embodiments, the gNB determines that the common command is to be issued upon an addition or admission, a modification or reconfiguration, a removal or release, or a handover of a QoE-driven ultra-high bandwidth demanding UE, RB and/or QoS service flow thereof.

In some embodiments, the gNB is triggered to issue the dedicated or common command by a control function of the core network, e.g., due to resource shortage at the CN side.

In some embodiments, the gNB may determine or trigger the issuing of the dedicated or common command itself. The gNB may notify the CN of the reconfiguration of the QoS configuration setting for one or more targeted UE(s).

In some embodiments, to allow the gNB to determine that a relevant UE missed receiving the common command and therefore is still applying its current QoS configuration or configuration setting that is unwanted by the gNB, the relevant UEs may be configured to send a confirmation of receiving the common or dedicated command. The confirmation may be sent using a MAC CE or physical layer UL control information. Thus, the gNB can resolve the issue for those UEs which have not provided a confirmation. The gNB may use or retransmit a dedicated command or use a RRC reconfiguration.

In some embodiments, the relevant UEs may be configured to set an 1-bit QoE change tag in a MAC header to indicate the change associated with the last-received dedicated or common command. For example, the 1-bit QoE change tag is initially set to 0 for as long as the initial QoS configuration or configuration setting associated with initial target QoE level is applied. Then upon receiving a dedicated or common command to use to a first next target QoS configuration or configuration setting associated with a first next target QoE level, the 1-bit QoE change tag is changed to 1 for as long as the first next target QoS configuration or configuration setting associated with the first next target QoE level is applied. Then upon receiving a dedicated or common command to use to a second next target QoS configuration or configuration setting, the 1-bit QoE change tag is changed to 0 for as long as the second next target QoS configuration or configuration setting is applied; and so forth.

In other embodiments, a QoE level tag may be provided which indicates a current QoE level.

In some embodiments, the application layer at the UE side or the network side may be updated of certain QoS setting parameter(s) such as GBR upon QoE driven QoS reconfiguration or adaptation. Based on this update, the application layer may be able to proactively adapt, for examples, source-coding rates or multimedia resolutions and/or multimedia contents (adding or removing QoE enhancing contents).

At the UE, the access layer that is handling the at least one logical connection (i.e., data transmission and reception according to the QoS configuration) may inform the application of the change of the QoS configuration by updating one or more QoS settings (i.e., new values of some QoS parameters or constraints). The access layer is below the application layer. The same may be done at the network side via the application function.

QoS configuration relate to services of the serving access network, applied on PDU session, RB, and/or QoS flow levels.

Some embodiments may enable a fast and efficient control of QoE driven QoS configuration or configuration setting for a class of UEs and advanced media services. An example thereof is an XR service.

Figure 6:
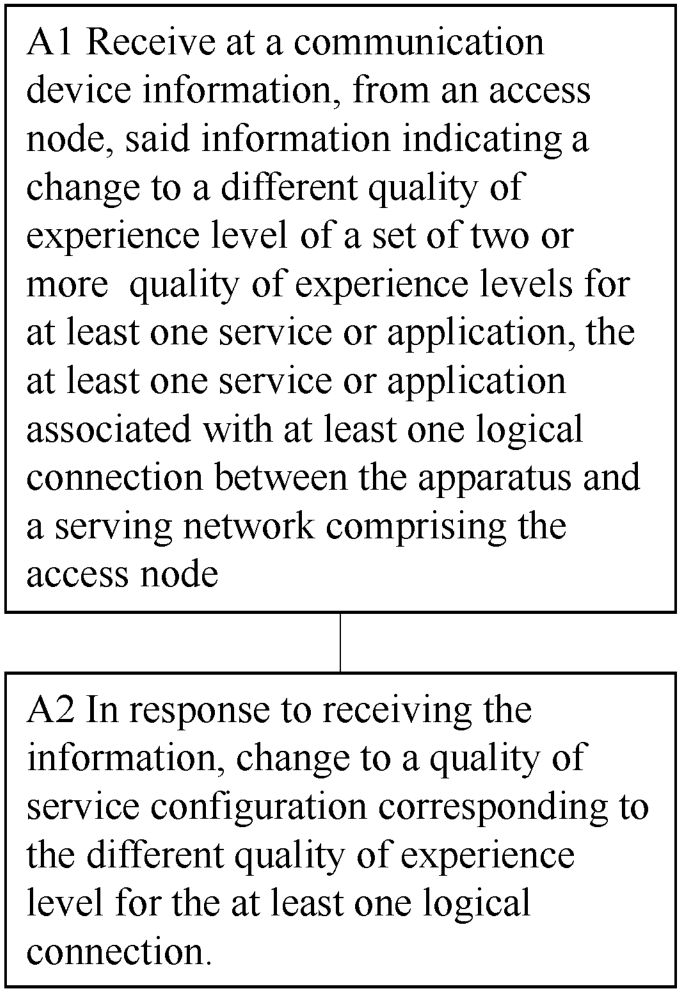
FIG. 6 shows a first method of some embodiments.

Reference is made to FIG. 6 which shows a method of some embodiments.

This method may be performed by an apparatus. The apparatus may be in or be a communication device.

The apparatus may comprise suitable circuitry for providing the method.

Alternatively or additionally, the apparatus may comprise at least one processor and at least one memory storing instructions that, when executed by the at least one processor cause the apparatus at least to provide the method below.

Alternatively or additionally, the apparatus may be such as discussed in relation to FIG. 2 or 3.

The method may be provided by computer program code or computer executable instructions.

The method may comprise, as referenced A1, receiving at a communication device information, from an access node, said information indicating a change to a different quality of experience level of a set of two or more quality of experience levels for at least one service or application, the at least one service or application associated with at least one logical connection between the apparatus and a serving network comprising the access node.

The method may comprise, as referenced A2, in response to receiving the information, changing to a quality of service configuration corresponding to the different quality of experience level for the at least one logical connection.

The at least one logical connection may comprise at least one data communication session, at least one radio bearer; or at least one service flow.

It should be appreciated that the method outlined in FIG. 5 may be modified to include any of the previously described features.

Figure 7:
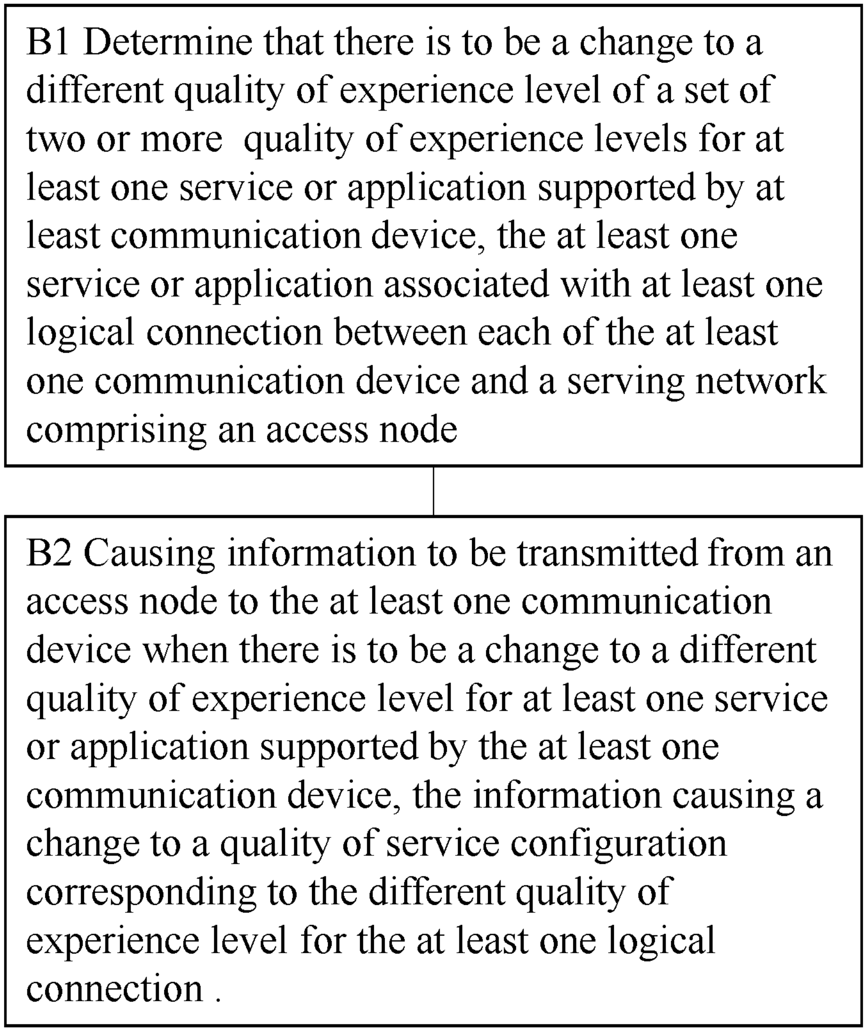
FIG. 7 shows a second method of some embodiments.

Reference is made to FIG. 7 which shows a method of some embodiments.

This method may be performed by an apparatus. The apparatus may be in or be an access node.

The apparatus may comprise suitable circuitry for providing the method.

Alternatively or additionally, the apparatus may comprise at least one processor and at least one memory storing instructions that, when executed by the at least one processor cause the apparatus at least to provide the method below.

Alternatively or additionally, the apparatus may be such as discussed in relation to FIG. 2.

The method may be provided by computer program code or computer executable instructions.

The method may comprise, as referenced B1, determining that there is to be a change to a different quality of experience level of a set of two or more quality of experience levels for at least one service or application supported by at least one communication device, the at least one service or application associated with at least one logical connection between each of the at least one communication device and a serving network comprising an access node.

The method may comprise, as referenced B1, causing information to be transmitted from an access node to the at least one communication device when there is to be a change to a different quality of experience level for at least one service or application supported by the at least one communication device, the information causing a change to a quality-of-service configuration corresponding to the different quality of experience level for the at least one logical connection.

The at least one logical connection may comprise at least one data communication session, at least one radio bearer; or at least one service flow.

It should be appreciated that the method outlined in FIG. 6 may be modified to include any of the previously described features.

Computer program code may be downloaded and stored in one or more memories of the relevant apparatus or device.

Therefore, although certain embodiments were described above by way of example with reference to certain example architectures for wireless networks, technologies and standards, embodiments may be applied to any other suitable forms of communication systems than those illustrated and described herein. In this example, some embodiments have been described in relation to a 5G network. It should be appreciated that other embodiments may be provided in any other suitable network in which multicast services are provided by access nodes. Those multicast services may be provided to UEs which are connected to the network or which are in an inactive state. In the inactive state, the connection has not been taken down but is inactive. For example, the context of the UE may be retained.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit such as a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may comprise one or more of general-purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiments of this disclosure. However, various modifications and adaptations may become apparent to those skilled in the relevant arts in view of the foregoing description, when read in conjunction with the accompanying drawings and the appended claims. Indeed, there are further embodiments comprising a combination of one or more embodiments with any of the other embodiments previously discussed. The scope of protection sought for some embodiments of the disclosure is set out by the claims. The embodiments and features, if any, described in this specification that do not fall under the scope of the claims are to be interpreted as examples useful for understanding various embodiments of the disclosure. It should be noted that different claims with differing claim scope may be pursued in related applications such as divisional or continuation applications.

The invention claimed is:

1. An communication device for communicating with an access node over an air interface, the communication device comprising:

at least one processor; and at least one memory storing instructions which, when executed by the at least one processor, cause the communication device at least to perform:

receiving information, from the access node, the information indicating a change to a different quality of experience level of a set of two or more quality of experience levels for at least one service or application supported by the communication device, the at least one service or application associated with at least one logical connection between the communication device and a serving network comprising the access node, the set of two or more quality of experience levels provisioned at the communication device, a respective quality of experience level of the set of two or more quality of experience levels corresponding to a respective quality of service configuration of a set of two or more quality of service configurations provisioned at the communication device, wherein the respective quality of experience level comprises an integer value indicating a respective level of quality of experience, wherein each of the set of two or more quality of service configurations is provisioned at the communication device in association with the respective quality of experience level during establishment of the at least one logical connection, and wherein the information indicating the change to the different quality of experience level comprises a command received via at least one of a layer 1 downlink control information on a physical downlink control channel with an associated control element or a layer 2 media access control control element; and based on the information that is received from the access node, changing configuration of the communication device to a quality of service configuration corresponding to the different quality of experience level for the at least one logical connection, the set of two or more quality of service configurations provisioned at the at least one communication device comprising the quality of service configuration, wherein the changing configuration of the communication device to the quality of service configuration corresponding to the different quality of experience level is performed without radio resource control reconfiguration of the at least one logical connection.

2. The communication device as claimed in claim 1, wherein the instructions, when executed by the at least one processor, further cause the communication device to perform:

causing data to be at least one of transmitted or received on the at least one logical connection, using the configuration of the communication device comprising the quality of service configuration corresponding to the different quality of experience level.

3. The communication device as claimed in claim 1, wherein the respective quality of service configuration corresponding to the respective quality of experience level comprises, for one or more quality of service parameters, a respective setting for the respective quality of experience level.

4. The communication device as claimed in claim 3, wherein the one or more quality of service parameters comprise all of: a bit rate, a packet delay budget, an averaging window, a data burst size, a priority, and a radio bearer mapping for a quality of service flow.

5. The communication device as claimed in claim 1, wherein the instructions, when executed by the at least one processor, further cause the communication device to perform:

monitoring for a command, the command being a common command for a plurality of communication devices, the plurality of communication devices including the communication device.

6. The communication device as claimed in claim 1, wherein the information indicating the change to the different quality of experience level indicates a step change to the different quality of experience level of the set of two or more quality of experience levels.

7. The communication device as claimed in claim 6, wherein the information indicates a step change to one of a next better quality of experience level in the set of quality of experience levels or a next lower quality of experience level in the set of quality of experience levels.

8. The communication device as claimed in claim 1, wherein the information indicating the change to the different quality of experience level identifies the different quality of experience level.

9. The communication device as claimed in claim 1, wherein the instructions, when executed by the at least one processor, further cause the communication device to perform:

receiving quality of service configuration information for the respective quality of service configuration for each of the quality of experience levels of the set of two or more quality of experience levels.

10. The communication device as claimed in claim 1, wherein the instructions, when executed by the at least one processor, further cause the communication device to perform:

updating an application layer of one or more quality of service settings based on the information indicating the change to the different quality of experience level of the set of two or more quality of experience levels that is received from the access node.

11. The communication device as claimed in claim 1, wherein the at least one service or application comprises an extended reality application.

12. The communication device as claimed in claim 1, wherein the information indicates a change to one of a highest quality of experience level in the set of quality of experience levels or a lowest quality of experience level in the set of quality of experience levels.

13. An access node for communicating with at least one communication device over an air interface, the access node comprising:

at least one processor; and at least one memory storing instructions which, when executed by the at least one processor, cause the access node at least to perform:

determining that there is to be a change to a different quality of experience level of a set of two or more quality of experience levels for at least one service or application supported by the at least one communication device, the at least one service or application associated with at least one logical connection between each of the at least one communication device and a serving network comprising an access node, the set of two or more quality of experience levels provisioned at each of the at least one communication device, a respective quality of experience level of the set of two or more quality of experience levels corresponding to a respective quality of service configuration of a set of two or more quality of service configurations provisioned at each of the at least one communication device, wherein the respective quality of experience level comprises an integer value indicating a respective level of quality of experience; and causing information to be transmitted from the access node to the at least one communication device when there is to be the change to the different quality of experience level for the at least one service or application supported by the at least one communication device, the information for causing a change to a quality of service configuration corresponding to the different quality of experience level for the at least one logical connection, the set of two or more quality of service configurations provisioned at each of the at least one communication device comprising the quality of service configuration, wherein each of the set of two or more quality of service configurations is provisioned at each of the at least one communication device in association with the respective quality of experience level during establishment of the at least one logical connection, wherein the information comprises a command caused to be transmitted via at least one of a layer 1 downlink control information on a physical downlink control channel with an associated control element or a layer 2 media access control control element, and the information for causing the change to the quality of service configuration without radio resource control reconfiguration of the at least one logical connection.

14. The access node as claimed in claim 13, wherein the determining that there is to be the change to the different quality of experience comprises: determining that there is to be the change to the different quality of experience in response to a trigger received from a control function of the serving network.

15. The access node as claimed in claim 13, wherein the determining that there is to be the change to the different quality of experience comprises:

determining that there is to be the change to the different quality of experience in response to an addition or admission, a modification or reconfiguration, a removal or release, or a handover that impacts one or more communication devices, the one or more communication devices including the at least one communication device.

16. The access node as claimed in claim 15, wherein the determining that there is to be the change to the different quality of experience in response to a removal or release that impacts one or more communication devices comprises:

determining that quality of service configurations of a plurality of communication devices are to be reconfigured to an increased quality of experience level of the set of two or more quality of experience levels, the determination triggered by a release of a connection with another communication device; and the causing information to be transmitted comprises causing a common quality of experience command to be transmitted to the plurality of communication devices, the common quality of experience command indicating the increased quality of experience level, wherein each of the plurality of communication devices reconfigures the quality of service configuration to a setting corresponding to the increased quality of experience level, and data communications of the plurality of communication devices use the quality of service configuration setting corresponding to the increased quality of experience level.

17. The access node as claimed in claim 13, wherein the determining that there is to be the change to the different quality of experience comprises: determining that there is to be the change to the different quality of experience in response to an addition or admission, a modification or reconfiguration, a removal or release, or a handover, that impacts one or more logical connections, the one or more logical connections including the at least one logical connection between each of the at least one communication device and the serving network.

18. The access node as claimed in claim 13, wherein the instructions, when executed by the at least one processor, further cause the access node to perform:

causing a command to be transmitted to the at least one communication device, the command being a common command for each of the at least one communication device.

19. The access node as claimed in claim 13, wherein the instructions, when executed by the at least one processor, further cause the access node to perform:

causing a notification to be provided to the serving network indicating the change to the different quality of experience level.

20. A method comprising:

receiving, at a communication device, from an access node, via an air interface, information indicating a change to a different quality of experience level of a set of two or more quality of experience levels for at least one service or application, the at least one service or application associated with at least one logical connection between the communication device and a serving network comprising the access node, the set of two or more quality of experience levels provisioned at the communication device, a respective quality of experience level of the set of two or more quality of experience levels corresponding to a respective quality of service configuration of a set of two or more quality of service configurations provisioned at the communication device, wherein the respective quality of experience level comprises an integer value indicating a respective level of quality of experience, wherein each of the set of two or more quality of service configurations is provisioned at the communication device in association with the respective quality of experience level during establishment of the at least one logical connection, and wherein the information indicating the change to the different quality of experience level comprises a command received via at least one of a layer 1 downlink control information on a physical downlink control channel with an associated control element or a layer 2 media access control control element; and based on the information that is received from the access node, changing configuration of the communication device to a quality of service configuration corresponding to the different quality of experience level for the at least one logical connection, the set of two or more quality of service configurations provisioned at the at least one communication device comprising the quality of service configuration, wherein the changing configuration of the communication device to the quality of service configuration corresponding to the different quality of experience level is performed without radio resource control reconfiguration of the at least one logical connection.

* * * * *